3,319,123
SAFETY DEVICE FOR PREVENTING ELECTRIC SHOCK BY QUICKLY DE-ENERGIZING A MALFUNCTIONING ELECTRIC CIRCUIT
Warren F. Scanlan, Philadelphia, Pa., assignor to Shock-Proof Electronics, Inc., Philadelphia, Pa., a corporation of Pennsylvania
Filed June 15, 1964, Ser. No. 375,087
3 Claims. (Cl. 317—18)

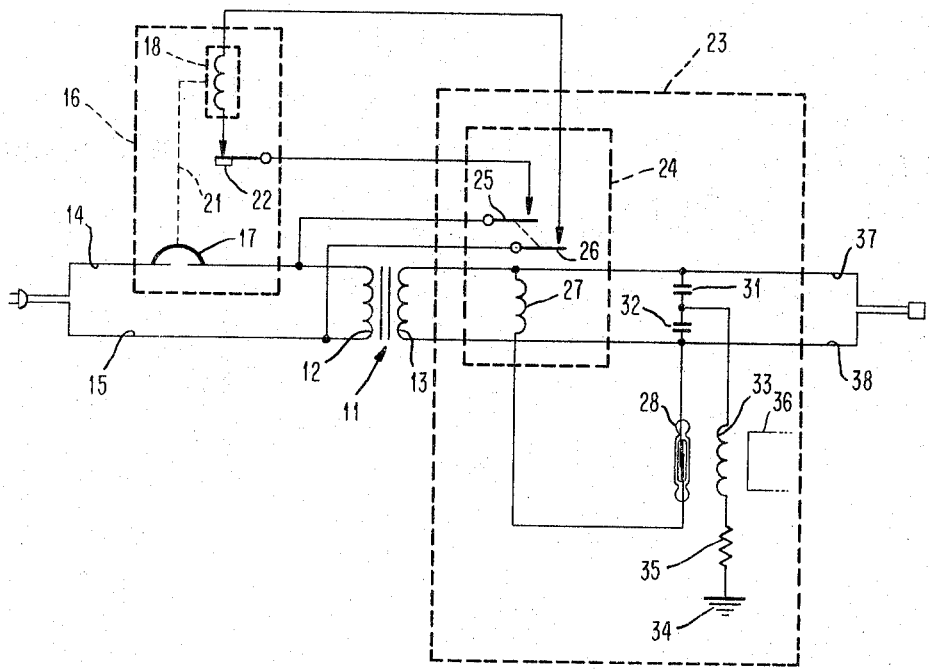

This invention relates to safety devices, and more particularly concerns a safety device for preventing electric shock.

Electric devices of today are dangerous to persons who accidentally come in contact with electrical leads. They might suffer an electrical shock. At times, the electric shock is so severe as to cause electrocution.

For example, a man using an electric shaver in the bathroom might drop the shaver into the water, and, upon reaching to retrieve the shaver, may close an electric circuit that would cause electrocution.

As another example, television sets develop very high voltages. Yet, some people like to watch television while in the bathtub where water presents a conductive path for electricity that could cause an electric shock.

There is danger of serious injury and death when a person accidentally contacts electric leads. Accordingly, it is an object of this invention to provide a safety device for preventing electric shock. It is another object of this invention to provide such a device which operates in response to a short or open circuit to de-energize any electric leads which may be accidentally contacted by a person. It is another object to de-energize such leads quickly, eliminating the chance that an electric shock could be delivered during the time the electric energy is collapsing. It is another object to provide such a device which is fail-safe.

Other objects and advantages of this invention, including its simplicity and economy, as well as the ease with which it may be adapted to existing equipment, will further become apparent hereinafter and in the drawings, in which:

FIG. 1 is a diagrammatic view of the electric circuit of a safety device for preventing electric shock constructed in accordance with the present invention.

Although specific terms are used in the following description for clarity, these terms are intended to refer only to the structure shown in the drawings and are not intended to define or limit the scope of the invention.

In the specific embodiment of the invention selected for illustration in the drawing, there is shown a safety device for preventing electric shock which comprises a one-to-one transformer 11 having a primary coil 12 and a secondary coil 13. Electric leads 14 and 15 extend from primary coil 12 and may be provided with prongs that are adapted for insertion into, for example, a wall plug in a bathroom.

A solenoid-operated circuit breaker 16 is provided which has a breaker contact 17 connected in series with primary coil 12, and has a breaker solenoid 18 connected in parallel with the primary coil. Solenoid 18 is connected to breaker contact 17 by mechanical linkage 21, and is connected in electrical series circuit with a reset switch 22 which is normally closed.

A sensor unit 23 is connected in circuit with secondary coil 13 and is responsive to a short circuit or an open circuit for energizing breaker solenoid 18 to open breaker contact 17, whereby the circuit breaker 16 is operated to de-energize transformer 11 and prevent electric shock to the person.

Sensor unit 23 includes a double-pole single-throw switch 24 having contacts 25 and 26 which are in series circuit with breaker solenoid 18. A switch-operating coil 27 is connected in parallel with transformer secondary coil 13 and is normally energized to hold switch contacts 25, 26 open.

A quick-acting normally-closed biased reed relay 28 is connected in series with switch-operating coil 27, and means are provided for controlling the operation of relay 28.

The control means comprises a pair of capacitors 31 and 32 connected across secondary coil 13, a relay-operating coil 33 connected from between capacitors 31, 32 to ground 34 through a resistor 35, and a permanent magnet 36 positioned adjacent reed relay 28 to hold the relay contacts in normally closed position. Capacitors 31 and 32 are balanced so that normally no current flows through relay-operating coil 33. Magnet 36 and coil 33 may be encapsulated in glass, if desired.

In operation, a short or an open circuit unbalances the capacitors 31, 32 which energizes relay-operating coil 33 to open the contacts of reed relay 28 and thereby de-energize the switch-operating coil 27. Contacts 25, 26 of switch 24 close and energize breaker solenoid 18 which opens breaker contact 17 and de-energizes the entire electric circuit of the safety device.

In practice, satisfactory results have been obtained where circuit breaker 16 is a 100 ampere, 115–220 volt circuit breaker, transformer 11 is a 120-volt transformer, coil 27 is a 1750 ohm coil, permanent magnet 36 is 32 gausses, coil 33 is a 10K, ohm coil, resistance 35 is in the range of 25K to 60K ohms, and capacitors 31 and 32 are rated at 400–600 volts and .1–5.0 microfarads.

Output leads 37, 38 of secondary coil 13, and of the safety device, may be in a receptacle form adapted to receive the plugs of an electric shaver, or a television set, or the like.

It is to be understood that the form of the invention herewith shown and described is to be taken as a presently preferred embodiment. Various changes may be made in the shape, size and arrangement of parts. For example, equivalent elements may be substituted for those illustrated and described herein, parts may be reversed, and certain features of the invention may be utilized independently of the use of other features, all without departing from the spirit or scope of the invention as defined in the subjoined claims.

The claimed invention:
1. A safety device for preventing electric shock comprising a transformer having primary and secondary coils, a solenoid-operated circuit breaker having a breaker contact connected in series with the primary coil and a breaker solenoid connected in parallel with the primary coil, and sensor means, including a switch in circuit with the breaker solenoid, and a normally energized switch-operating coil holding said switch open, said sensor means being connected in circuit with the secondary coil and responsive to a short circuit or an open circuit for energizing said solenoid to de-energize said switch-operating coil to close said switch and open said contact, thereby operating said circuit breaker to de-energize said transformer and prevent electric shock to the person.

2. The safety device defined in claim 1, wherein the sensor means includes said switch in series with said breaker solenoid, said switch-operating coil being connected in parallel with the transformer secondary coil and normally energized to hold said switch open, a quick-acting normally-closed biased reed relay connected in series with said switch-operating coil, and control means for controlling the operation of said biased reed relay so that opening the reed relay de-energizes the switch-operating coil to close said switch and energize the breaker solenoid to open the transformer primary coil.

3. The safety device defined in claim 2 wherein said control means comprises a pair of capacitors connected across said secondary coil, a relay-operating coil connected from between said capacitors to ground, and a permanent magnet positioned adjacent said reed relay to hold the relay contacts closed, said capacitors being balanced so that normally no current flows through said relay-operating coil, whereby a short or an open circuit energizes the relay-operating coil to open said reed relay and de-energize said switch-operating coil to close said switch and energize said breaker solenoid to open the breaker contact.

References Cited by the Examiner
UNITED STATES PATENTS 3,168,682   2/1965   Moore et al. _____ 317—18
3,229,163   1/1966   Rogers _____ 317—18

MILTON O. HIRSHFIELD, *Primary Examiner.*

R. V. LUPO, *Assistant Examiner.*